United States Patent [19]
Yoshida et al.

[11] Patent Number: 5,973,614
[45] Date of Patent: Oct. 26, 1999

[54] RADIO PAGING SYSTEM USING RADIO SELECTIVE PAGING RECEIVER

[75] Inventors: Toshio Yoshida; Kiyotaka Yamashige, both of Tokyo, Japan

[73] Assignee: NEC Corporation, Japan

[21] Appl. No.: 08/978,677

[22] Filed: Nov. 26, 1997

Related U.S. Application Data

[63] Continuation of application No. 08/649,186, May 17, 1996, abandoned.

[30] Foreign Application Priority Data

May 19, 1995 [JP] Japan .................................. 7-121854

[51] Int. Cl.[6] ..................................................... H04Q 7/14
[52] U.S. Cl. ..................................... 340/825.44; 455/11.1; 455/426; 455/517; 455/575; 370/313; 370/315; 375/211
[58] Field of Search ........................... 340/825.44, 311.1, 340/825.48, 825.47; 455/11.1, 15, 7, 426, 526, 517, 575, 38.5, 31.1, 31.2, 31.3, 38.1, 38.2; 370/310, 312, 313, 315; 375/211, 220, 214; 1/1

[56] References Cited

U.S. PATENT DOCUMENTS

| | | |
|---|---|---|
| 4,382,256 | 5/1983 | Nagata .............................. 340/825.44 |
| 4,539,706 | 9/1985 | Mears et al. .......................... 455/15 X |
| 4,661,972 | 4/1987 | Kai ................................. 340/825.44 X |
| 4,734,694 | 3/1988 | Umetsu et al. ..................... 340/825.44 |
| 4,835,777 | 5/1989 | Deluca et al. ................. 340/825.44 X |
| 4,906,989 | 3/1990 | Kasugai ............................. 340/825.44 |
| 4,935,732 | 6/1990 | Andros et al. ..................... 340/825.44 |
| 5,133,080 | 7/1992 | Borras .................................... 455/15 X |
| 5,179,720 | 1/1993 | Grube et al. ....................... 455/33.4 X |
| 5,408,679 | 4/1995 | Masuda ................................ 455/11.1 |
| 5,459,761 | 10/1995 | Monica et al. .......................... 375/211 |

FOREIGN PATENT DOCUMENTS

| | | |
|---|---|---|
| 0503813 | 9/1992 | European Pat. Off. . |
| 4-49724 | 2/1992 | Japan . |
| 1357857 | 8/1972 | United Kingdom . |

*Primary Examiner*—Brian Zimmerman
*Assistant Examiner*—William H. Wilson, Jr.
*Attorney, Agent, or Firm*—Ostrolenk, Faber, Gerb & Soffen, LLP

[57] ABSTRACT

In a radio paging system, first and second radio units perform radio communication via a relay station. This system includes a radio selective paging receiver for receiving a radio wave from the relay station and generating a ringing tone to call a callee at the second radio unit when the first radio unit calls the second radio unit.

6 Claims, 6 Drawing Sheets

FIG. 5

| BIT / OCTET | 7 | 6 | 5 | 4 | 3 | 2 | 1 | 0 |
|---|---|---|---|---|---|---|---|---|
| 1 | \multicolumn{8}{l|}{CONNECTION REQUEST MESSAGE} |
| 2-3 | \multicolumn{8}{c|}{CALL CODE} |
| 4-7 | \multicolumn{8}{c|}{ORIGINATING MOBILE STATION IDENTIFICATION NUMBER} |
| 8 | \multicolumn{4}{c|}{COMMUNICATION FORM} | \multicolumn{4}{c|}{TRANSMISSION MODE} |
| 9 | \multicolumn{2}{c|}{SLOT ASSIGNMENT} | \multicolumn{2}{c|}{PROTOCOL TYPE} | \multicolumn{4}{c|}{REQUEST SLOT COUNT} |
| 10-11 | \multicolumn{8}{c|}{EXPANSION TRANSMISSION MODE} |
| 12 | | | | | | | | |

Octet 1 bits: 0 0 0 1 0 0 (MESSAGE TYPE)

FIG. 6

| BIT<br>OCTET | 7 | 6 | 5 | 4 | 3 | 2 | 1 | 0 |
|---|---|---|---|---|---|---|---|---|
| 1 | \multicolumn{6}{c}{CONNECTION ANSWER MESSAGE<br>0  0  0  1  0  0<br>MESSAGE TYPE} | | |
| 2 | \multicolumn{8}{c}{CALL CODE} |
| 3 | | | | | | | | |
| 4 | \multicolumn{8}{c}{ORIGINATING MOBILE STATION} |
| 5 | \multicolumn{8}{c}{IDENTIFICATION NUMBER} |
| 6 | | | | | | | | |
| 7 | | | | | | | | |
| 8 | \multicolumn{8}{c}{RESERVATION} |
| 9 | | | | | | | | |
| 10 | | | | | | | | |
| 11 | | | | | | | | |
| 12 | | | | | | | | |

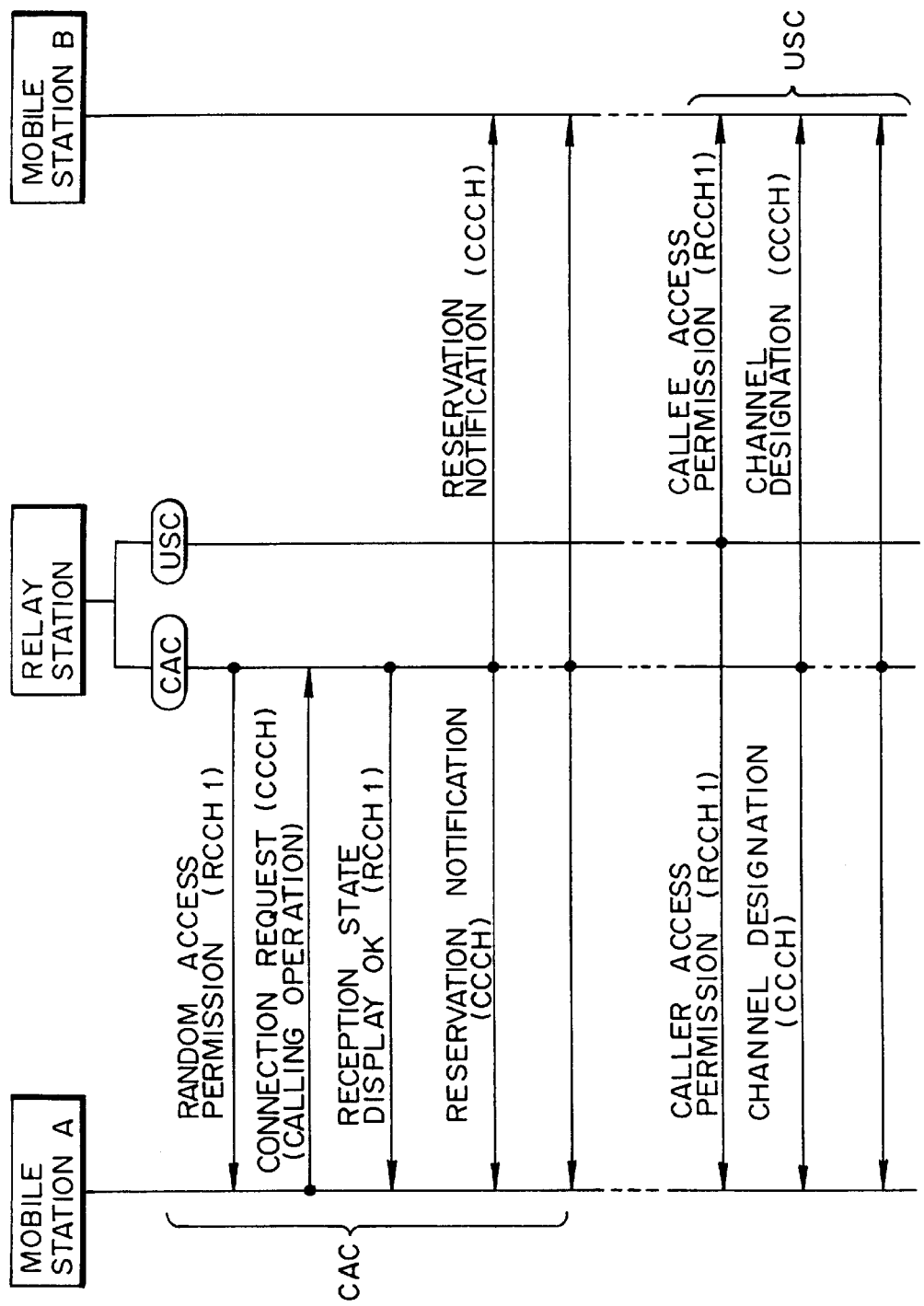

RADIO PAGING SYSTEM USING RADIO SELECTIVE PAGING RECEIVER

This is a Continuation of application Ser. No. 08/649,186, filed on May 17, 1996, now abandoned,

BACKGROUND OF THE INVENTION

1. Field of the Invention

The present invention relates to a radio paging system using a radio selective paging receiver and, more particularly, to a radio selective paging receiver designed to directly receive a radio wave from a relay station in an MCA system.

2. Description of the Prior Art

As a mobile communication means, an MCA (multi-channel access) system is widely used. This system is designed to realize radio communication between a fixed station and mobile station or between a given mobile station and another mobile station via an MCA relay station. For example, the system allows communication between an office as a fixed station and a vehicle as a mobile station or between vehicles.

Assume that a callee in a vehicle having a mobile station moves to a desired place, and he/she leaves the vehicle to do some work. In this case, since the radio communication unit of the mobile station is fixed on the vehicle or relatively large, the callee seldom leaves the vehicle carrying the radio communication unit. For this reason, a caller cannot reach the callee while the callee stays at a predetermined distance or more from the vehicle.

If the callee carries a radio selective paging receiver which can be called through a general telephone line, the caller can reach the callee even if the callee leaves the vehicle. In this case, however, the caller must pay a telephone line charge to call the radio selective paging receiver.

Japanese Unexamined Patent Publication No. 4-49724 filed by the present applicant discloses a radio paging system using a radio selective paging receiver for receiving a radio wave from the radio communication unit of a mobile station. In this system, a callee carries a radio selective paging receiver when he/she leaves a vehicle so that the callee can be called through the radio selective paging receiver designed to receive a radio wave from the radio communication unit of the mobile station when another calls the mobile station.

In the radio paging system disclosed in Japanese Unexamined Patent Publication No. 4-49724, however, when the mobile station receives a radio wave from another station via the MCA relay station, the radio communication unit of the mobile station outputs a radio wave for calling the radio selective paging receiver. According to the radio law, however, the radio wave that can be output from the mobile station to call the radio selective paging receiver is limited, and it is difficult to ensure a radio output large enough to call the radio selective paging receiver carried by the callee. In some case, the radio selective paging receiver cannot receive the radio wave from the radio communication unit of the mobile station.

SUMMARY OF THE INVENTION

The present invention has been made in consideration of the above situation, and has as its object to provide a radio paging system which can call a callee without any telephone line charge even if the callee is at a predetermined distance or more from a mobile station which is to receive an incoming call, and a radio selective paging receiver used in the system.

In order to achieve the above object, according to the basic aspect of the present invention, there is provided a radio paging system in which first and second radio units perform radio communication via a relay station, comprising a radio selective paging receiver for receiving a radio wave from the relay station and generating a ringing tone to call a callee at the second radio unit when the first radio unit calls the second radio unit.

According to the second aspect of the present invention, there is provided a radio paging system in which the relay station in the basic aspect is a relay station in an MCA system.

According to the third aspect of the present invention, there is provided a radio paging system in which the radio selective paging receiver in the basic aspect comprises a receiving section including an antenna for receiving a radio wave from the relay station, a demodulating section for demodulating the received radio wave, a CPU having a determining section for comparing a self apparatus ID with a terminating station ID contained in the data demodulated by the demodulating section, and if the IDs coincide with each other, determining that the data is data for calling the self apparatus, a RAM for storing the data determined as the data for calling the self apparatus by the self apparatus, a ringing tone generating section for generating a ringing tone, when the determining section determines that the data demodulated by the demodulating section is the data for calling the self apparatus, and a display section for displaying an originating station ID contained in the data stored in the RAM.

According to the fourth aspect of the present invention, there is provided a radio paging system in which the display section in the third aspect is further designed to display a reception time of the data determined as the data for calling the self apparatus by the determining section.

According to the fifth aspect of the present invention, there is provided a radio paging system in which the display section in the third aspect is further designed to display a message contained in the data determined as the data for calling the self apparatus by the determining section.

As is understood from the above aspects, according to the present invention, the radio selective paging receiver directly receives a radio wave from the relay station in the MCA system, and the demodulating section demodulates the radio wave. If the determining section of the CPU determines that the demodulated data is data for calling the self apparatus, the CPU causes the ringing tone generating section to generate a ringing tone, stores the data in the RAM, and causes the display section to display the originating station ID.

The radio selective paging receiver can directly receive a radio wave from the MCA relay station. For this reason, the caller can call the callee carrying the radio selective paging receiver with him/her as long as he/she is present in a place where he/she can receive a radio wave from the MCA relay station regardless of the distance between the radio selective paging receiver carried by the callee and the mobile station which calls the receiver.

Furthermore, according to the radio paging system of the present invention, since the radio selective paging receiver is designed to directly receive a radio wave from the MCA relay station, no telephone line charge is imposed.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 5 is a view showing an example of the signal format of a call request signal transmitted from an originating mobile station in the radio paging system of the present invention;

FIG. 6 is a view showing an example of the signal format of an answer signal transmitted from a terminating mobile station in the radio paging system of the present invention; and FIG. 7 is a view showing a sequence of performing connection between mobile stations A and B and a relay station arranged in the radio paging system of the present invention.

DETAILED DESCRIPTION OF THE PREFERRED EMBODIMENT

A preferred embodiment of the present invention will be described below with reference to the accompanying drawings.

Figure 1:
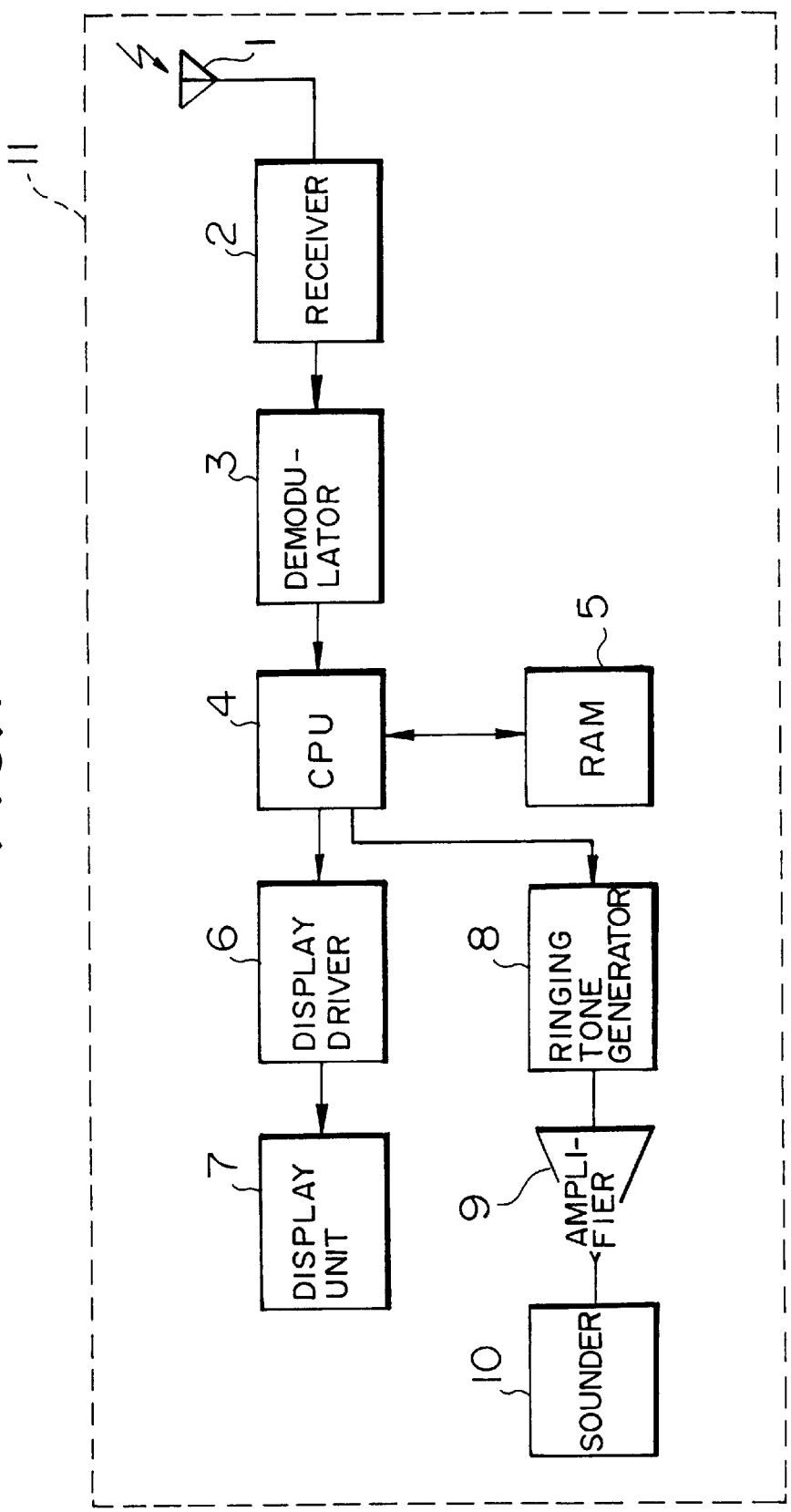
FIG. 1 is a block diagram showing an example of the arrangement of a radio selective paging receiver according to the present invention.

FIG. 1 is a block diagram showing an example of the arrangement of a radio selective paging receiver of the present invention.

A radio selective paging receiver 11 is constituted by a built-in antenna 1, a receiver 2, a demodulator 3, a CPU 4, a RAM 5, a display driver 6, a display unit 7, a ringing tone generator 8, an amplifier 9, and a sounder 10.

Figure 3:
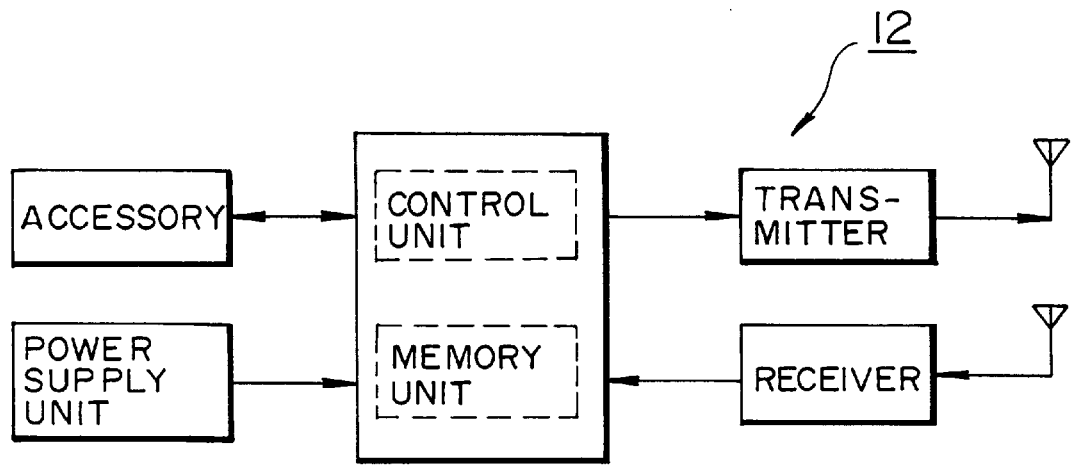
FIG. 3 is a block diagram showing an example of the arrangement of a relay station used in the radio paging system of the present invention.

The receiver 2 is connected to the built-in antenna 1 and serves as a radio receiver which can cope with a radio channel. The receiver 2 directly receives a radio wave from an MCA relay station (FIG. 3 shows an example of its arrangement). The receiver 2 is connected to the demodulator 3 to realize a demodulation modem function using the demodulator 3. That is, the receiver 2 demodulates data from the received radio wave.

The CPU 4 controls the respective constituent elements, i.e., the demodulator 3, the RAM 5, the display driver 6, and the ringing tone generator 8, to realize the overall control of the radio selective paging receiver 11. The CPU 4 also discriminates the terminating station ID or destination ID on the basis of data received by the receiver 2 and demodulated by the demodulator 3. If the ID is the self apparatus ID, the CPU 4 drives the ringing tone generator 8 to cause the sounder 10 to generate a ringing tone via the amplifier 9. At the same time, the CPU 4 stores the data in the RAM 5. In addition, the CPU 4 drives the display driver 6 to cause the display unit 7 to display the originating station ID or source ID and the reception time included in the data stored in the RAM 5.

Figure 2:
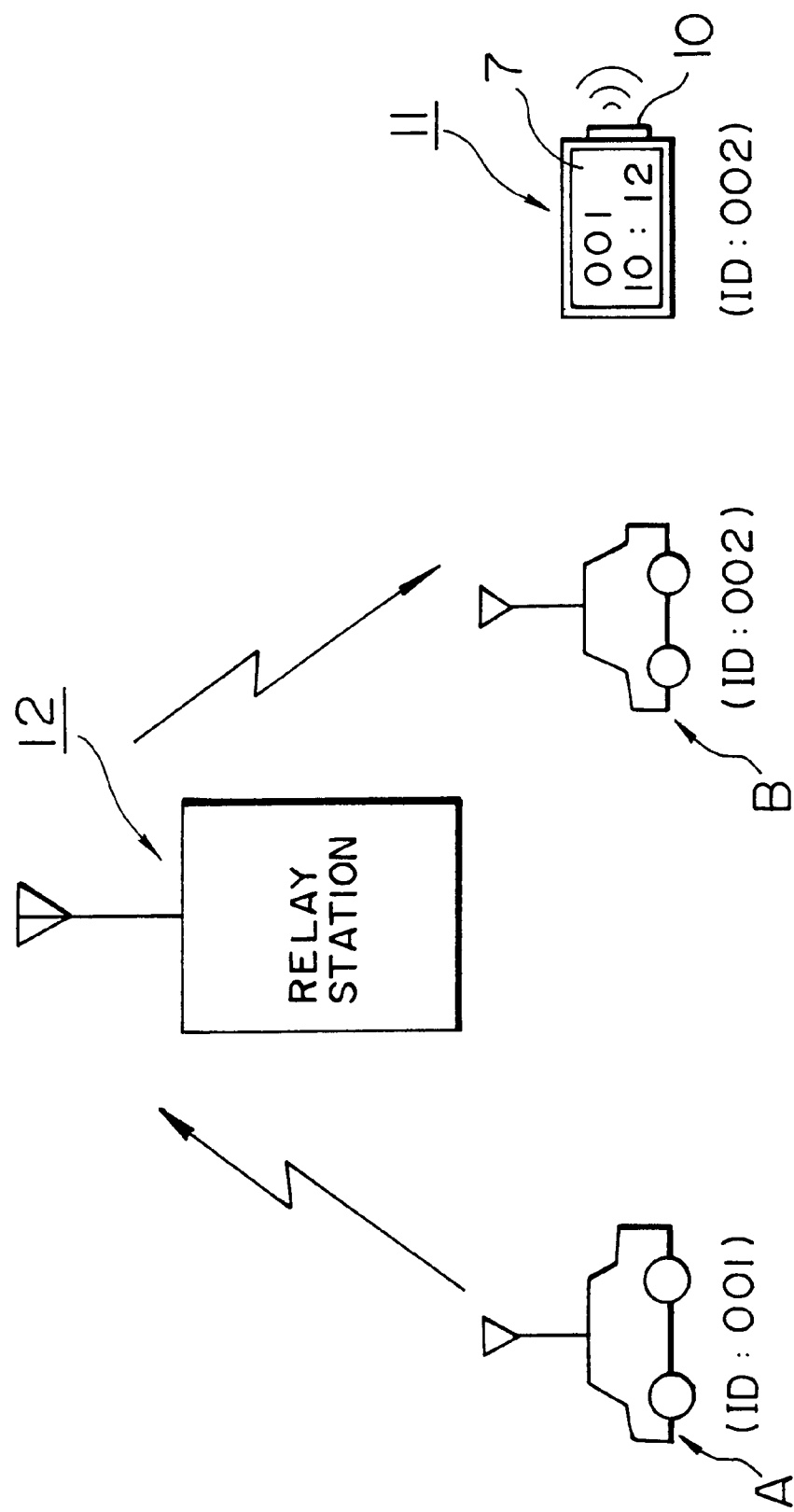
FIG. 2 is a schematic view for explaining a radio paging system using the radio selective paging receiver in FIG. 1 according to an embodiment of the present invention.

FIG. 2 is a schematic view for explaining a radio paging system using the radio selective paging receiver in FIG. 1 according to an embodiment of the present invention.

Figure 4:
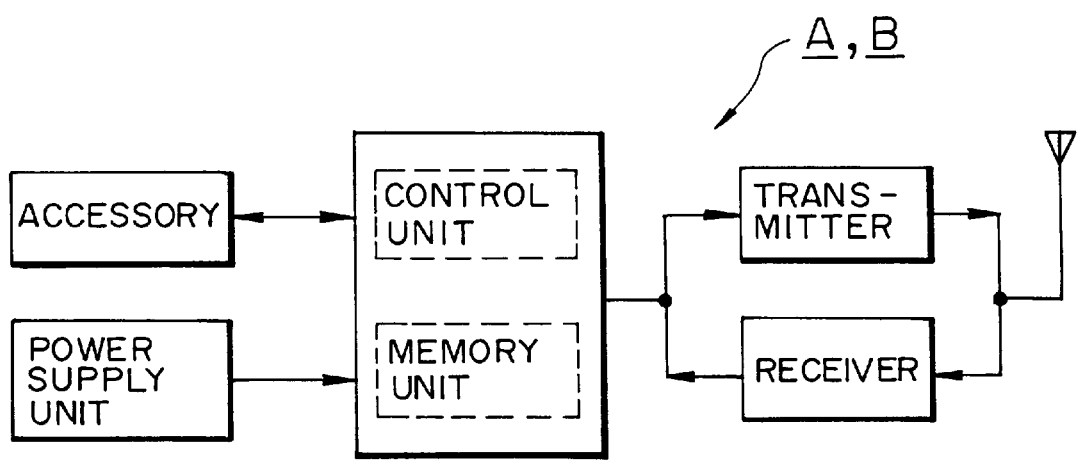
FIG. 4 is a block diagram showing an example of the arrangement of a mobile station used in the radio paging system of the present invention.

In the system in FIG. 2, mobile stations A and B (FIG. 4 shows an example of their arrangement) are installed in vehicles, and radio communication units are arranged in both the mobile stations A and B. As self station IDs, for example, "001" and "002" are respectively assigned to the mobile stations A and B. The callee who owns the vehicle having the mobile station B is carrying the radio selective paging receiver 11 with him/her, and ID "002", which is identical to the ID of the mobile station B, is assigned as a self apparatus ID to the radio selective paging receiver 11.

Assume that the mobile station A sends a call request signal to the mobile station B. In this case, the mobile station A transmits a radio wave signal containing ID "002" of the mobile station B as a terminating station ID and ID "001" of the mobile station A as an originating station ID. This radio wave signal is received by a relay station 12 as an MCA relay station, and is transmitted to the mobile station B again from the relay station 12.

The mobile station B receives the radio wave signal from the relay station 12. If the terminating station ID contained in this radio wave signal coincides with the self station ID, the mobile station B transmits a radio wave signal to the mobile station A via the relay station 12 in response to the received radio wave signal. Upon reception of this response radio wave signal via the relay station 12, the mobile station A recognizes that speech communication with the mobile station B is possible. If, therefore, the callee who owns the vehicle having the mobile station B needs to leave the vehicle, he/she carries the radio selective paging receiver 11 with him/her after turning off the radio communication unit arranged in the mobile station B.

Assume that the mobile station B receives an incoming call, but the callee is not present in the vehicle having the mobile station B. In this case, if the radio communication unit arranged in the mobile station B is turned off, as described above, the mobile station B can be made not to respond to the call. Consequently, in the mobile station A as the originating station, the caller can determine that the callee is not present in the vehicle having the mobile station B as the terminating station. However, the present invention is not limited to this. Even if the callee who owns the vehicle having the mobile station B leaves the vehicle without turning off the radio communication unit arranged in the mobile station B, the caller can call the callee by using the radio selective paging receiver 11.

The self apparatus ID of the radio selective paging receiver 11 is identical to the ID of the mobile station B. For this reason, if the mobile station A generates a call request to the mobile station B, the sounder 10 generates a ringing tone, and the display unit 7 displays the originating station ID and the reception time, as described above.

With this operation, the callee who owns the vehicle having the mobile station B and is carrying the radio selective paging receiver 11 with him/her can know that an incoming call is received from the mobile station A having ID "001" at 10: 12, as shown in FIG. 2, and hence can call back the mobile station A having ID "001".

FIGS. 5 and 6 respectively show examples of the signal formats of a call request signal transmitted from the originating mobile station A and an answer signal transmitted from the terminating mobile station B in the radio paging system of the present invention described above.

FIG. 7 shows a sequence of performing connection between the mobile stations A and B and the relay station arranged in the radio paging system of the present invention. As is apparent from FIG. 7, two types of connection lines, namely CAC (common access channel) and USC (user specific channel), are used in the MCA relay station.

In this embodiment, the radio selective paging receiver 11 generates a ringing tone from the sounder 10 and displays the originating station ID and the reception time on the display unit 7. However, the present invention is not limited to this. For example, some message may be transmitted from the mobile station A as the originating station to be received and displayed.

In addition, in this embodiment, in the MCA system, a callee in a mobile station which receives an incoming call carries a radio selective paging receiver with him/her. However, even a callee in a fixed station may carry a radio selective paging receiver with him/her.

What is claimed is:

1. A radio paging system comprising:

first and second radio units performing radio communication via a relay station, said first radio unit generating a radio wave containing an ID of said second radio unit when said first radio unit calls said second radio unit;

a radio selective paging receiver having the same ID as said second radio unit, said radio selective paging receiver receiving said radio wave directly from said relay station and generating a ringing tone in response to said reception of said radio wave.

2. A system according to claim 1, wherein said relay station is a relay station in an MCA system.

3. A system according to claim 2, wherein said radio selective paging receiver comprises:

a receiving section including an antenna for receiving said radio wave from said relay station;

a demodulating section for demodulating the received radio wave;

a CPU having a determining section for comparing said ID of the radio selective paging receiver with a terminating station ID contained in the data demodulated by said demodulating section, and if the IDs coincide with each other, determining that the data is data for calling the radio selective paging receiver;

a RAM for storing the data determined as the data for calling the radio selective paging receiver;

a ringing tone generating section for generating said ringing tone, when said determining section determines that the data demodulated by said demodulating section is the data for calling said radio selective paging receiver; and a display section for displaying an originating station ID contained in the data stored in said RAM.

4. A system according to claim 1, wherein said radio selective paging receiver comprises:

a receiving section including an antenna for receiving said radio wave from said relay station;

a demodulating section for demodulating the received radio wave;

a CPU having a determining section for comparing said ID of the radio selective paging receiver with a terminating station ID contained in the data demodulated by said demodulating section, and if the IDs coincide with each other, determining that the data is data for calling the radio selective paging receiver;

a RAM for storing the data determined as the data for calling the radio selective paging receiver;

a ringing tone generating section for generating said ringing tone, when said determining section determines that the data demodulated by said demodulating section is the data for calling said radio selective paging receiver; and a display section for displaying an originating station ID contained in the data stored in said RAM.

5. A system according to claim 4, wherein said display section is further designed to display a reception time of the data determined as the data for calling the radio selective paging receiver by said determining section.

6. A system according to claim 4, wherein said display section is further designed to display a message contained in the data determined as the data for calling the radio selective paging receiver by said determining section.

* * * * *